(12) United States Patent
Baldini et al.

(10) Patent No.: US 6,722,236 B1
(45) Date of Patent: Apr. 20, 2004

(54) REVOLVING TRANSFER MACHINE

(75) Inventors: Guido Baldini, Grancia (CH); Thomas Treib, Carona (CH)

(73) Assignee: Mikron SA Agno, Lugano (CH)

( * ) Notice: Subject to any disclaimer, the term of this patent is extended or adjusted under 35 U.S.C. 154(b) by 0 days.

(21) Appl. No.: 09/622,845

(22) PCT Filed: Feb. 23, 1999

(86) PCT No.: PCT/CH99/00083
§ 371 (c)(1),
(2), (4) Date: Oct. 18, 2000

(87) PCT Pub. No.: WO99/43464
PCT Pub. Date: Sep. 2, 1999

(30) Foreign Application Priority Data

Feb. 24, 1998 (EP) .............................. 98810148

(51) Int. Cl.[7] .............................. B23B 7/16; B23B 9/12
(52) U.S. Cl. .............................. 82/117; 82/122; 82/149
(58) Field of Search .......................... 82/122, 117, 118, 82/123, 124, 129, 130, 1.11, 133, 138, 146, 156

(56) References Cited

U.S. PATENT DOCUMENTS

| 1,492,103 | A | * | 4/1924 | Parkes .......................... 82/122 |
| 2,540,186 | A | * | 2/1951 | Bullard et al. .............. 279/4.12 |
| 2,953,949 | A |   | 9/1960 | Witzig et al. |
| 3,158,065 | A | * | 11/1964 | Korenek et al. ............ 409/143 |
| 3,244,037 | A | * | 4/1966 | Ruehmer ...................... 82/110 |
| 3,792,633 | A | * | 2/1974 | Filipiev et al. .............. 29/38 A |
| 5,697,270 | A |   | 12/1997 | Link |

FOREIGN PATENT DOCUMENTS

| DE | 1027959 | 4/1958 |
| DE | C2-3941480 | 7/1992 |
| DE | 43 01 393 A1 | 7/1994 |
| EP | 0 561 260 A1 | 9/1993 |
| EP | A1785040 | 7/1997 |

* cited by examiner

Primary Examiner—Henry W. H. Tsai

(57) ABSTRACT

A rotary indexing machine has a fixed machine frame, which is designed for holding a multiplicity of machining units and includes at least one support. The rotary indexing machine has a rotary table rotatable relative to the machine frame about a vertical indexing axis to be arranged on the rotary table The support is designed for the lateral attachment of at least one of the machining units to create free space for machining. The machine frame has high rigidity and stability, a large free space for machining workpieces being created at the same time in the region of the rotary table, and good accessibility of satellites. The indexing devices and the rotary table ensure adjustment or setting-up of the machine.

14 Claims, 6 Drawing Sheets

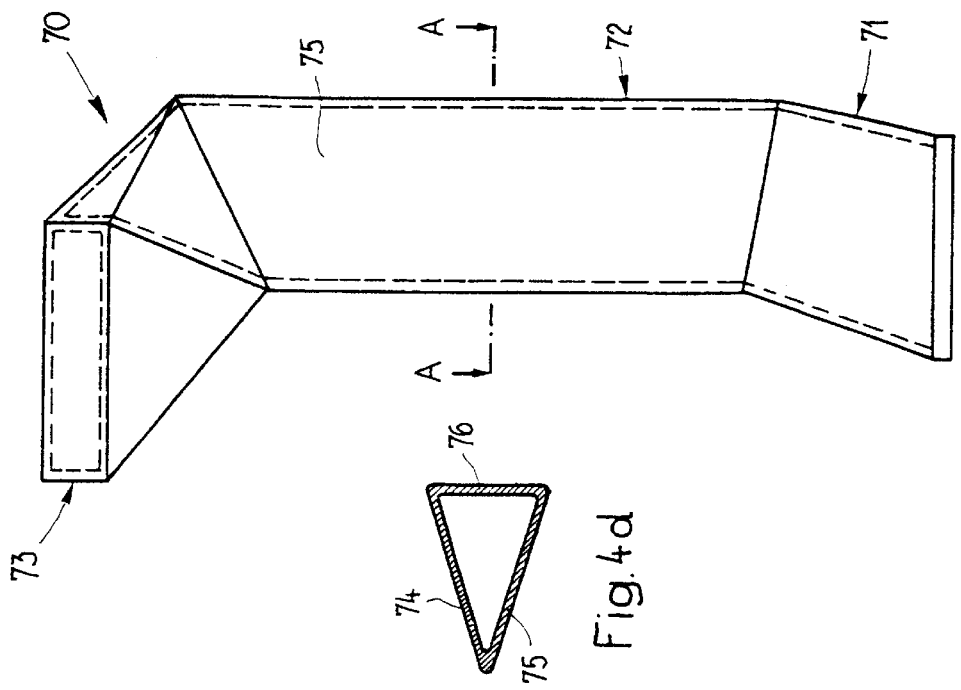
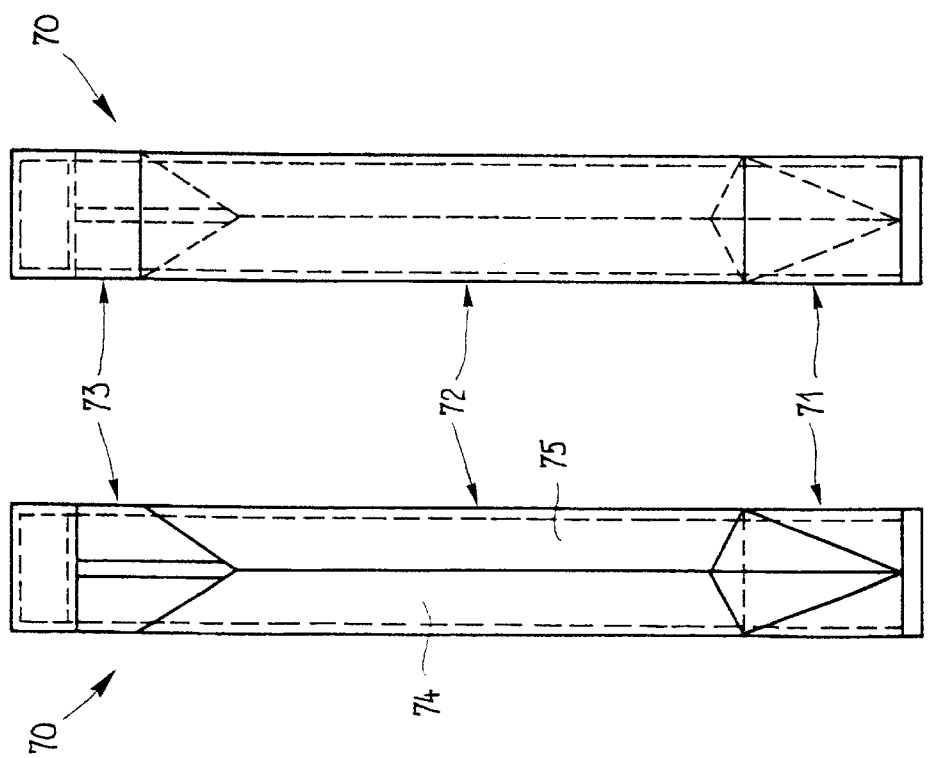

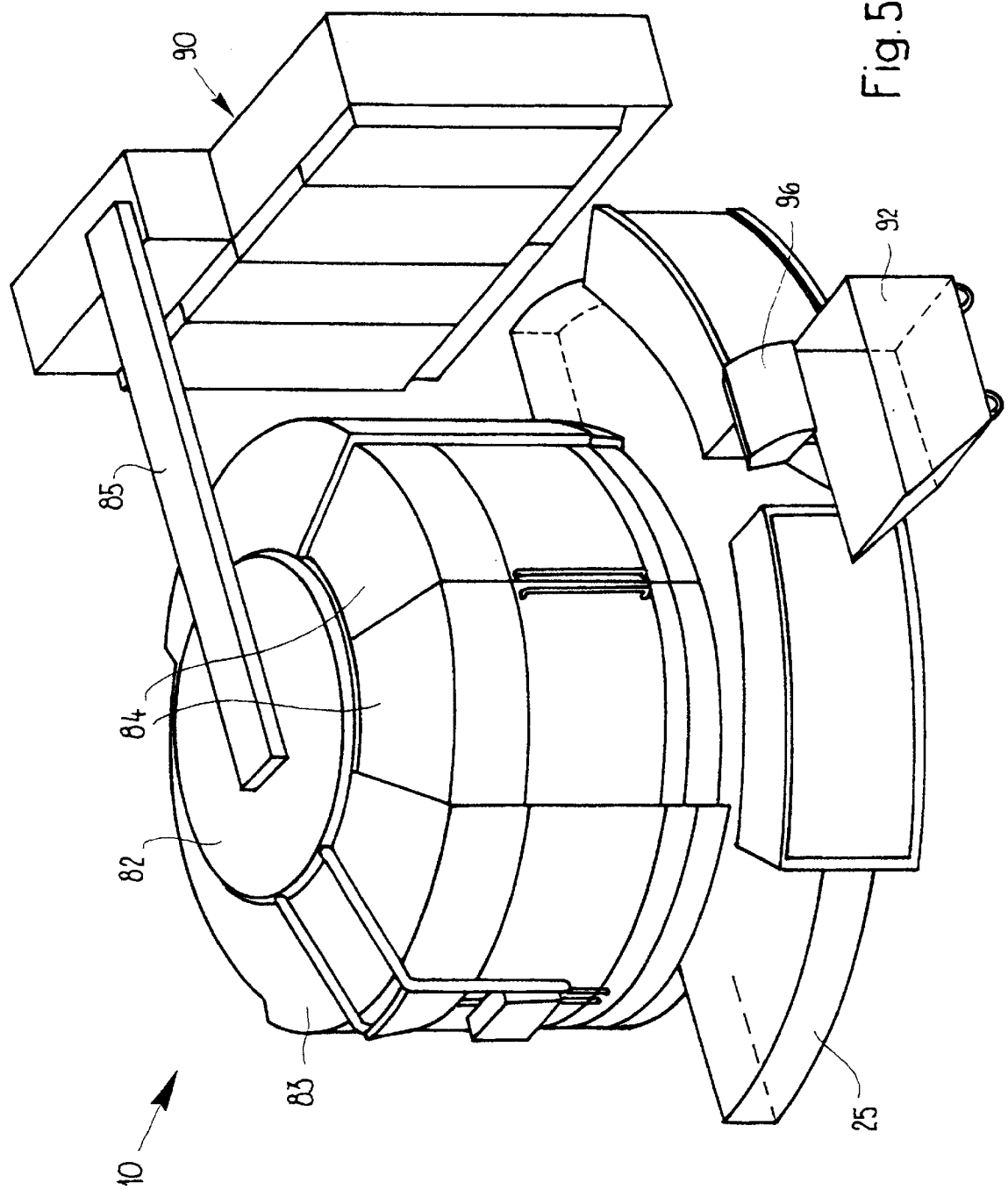

REVOLVING TRANSFER MACHINE

TECHNICAL FIELD

The present invention relates to a rotary indexing machine having a plurality of machining stations and a plurality of work-holding devices arranged on a rotary table.

PRIOR ART

The term rotary indexing machine (also called rotary transfer machine or rotary table machine) refers to a machine tool in which a plurality of work-holding devices (called satellites below) are arranged like satellites on a rotary table (also called a plate) rotatable about a vertical indexing axis. Each satellite is provided with at least one clamping device for clamping a workpiece. A plurality of fixed machining stations for machining the workpieces carried on the satellites are provided along the periphery of the rotary table. For the multiple machining of the workpieces, the rotary table is gradually rotated or indexed further from one working position to the next, in the course of which the workpieces arranged on the rotary table are gradually moved further (or indexed) from one machining station to the next, where the workpieces are in each case machined with one or more fixed machining units. This permits multiple machining of the workpieces by means of a multiplicity of machining units in a single set-up.

DE-C2-39 41 480 discloses a rotary indexing machine having an essentially cage-like, one-piece rigid machine frame, in the wall parts of which the machining units are mounted at the various machining stations. So that the workpieces to be machined which are arranged on the rotary table can be positioned as precisely as possible relative to the tools attached to the machining units, the machine frame must be as rigid as possible. The requirements for the rigidity of the machine frame are especially high when a plurality of machining units are arranged at a single machining station, since the frame, during the simultaneous machining with the various machining units, then has to absorb the sum of the reaction and acceleration forces which occur as far as possible in a distortion-free and rigid manner, so that the machining tolerances can be maintained. In order to be able to fulfill the requirement for high rigidity, the machine frame parts of known rotary indexing machines are on the one hand designed to be extremely solid and correspondingly voluminous and on the other hand are arranged as close to the workpiece to be machined as possible, i.e. to the rotary table.

On account of the arrangement of solid, bulky frame parts, such as supports, struts, etc., in the vicinity of the rotary table, the conventional machine frames of rotary indexing machines occupy a considerable portion of the space which would actually be required for the machining of the workpieces. This problem again occurs to a considerable degree in rotary indexing machines having a plurality of machining units at a single machining station, since, inter alia, electrical and hydraulic lines to each of the machining units additionally occupy further space, which is then no longer available for the actual machining of the workpieces. The conflicting requirements, on the one hand to provide a machine frame of high rigidity in order to be able to maintain close tolerances during the machining of the workpieces, and on the other hand to create sufficient free space in the center of the rotary indexing machine in the region of the rotary table for the machining of complicated workpieces as well, are not fulfilled in a satisfactory manner in conventional rotary indexing machines.

DESCRIPTION OF THE INVENTION

The object of the present invention is to provide a rotary indexing machine which has a rigid machine frame and provides a large free space in the region of the rotary table for the machining of workpieces.

The solution of the object is the subject matter of the independent patent claims.

The rotary indexing machine according to the invention has a fixed machine frame, which is designed for holding a multiplicity of machining units and comprises at least one support, and a rotary table rotatable relative to the machine frame about a vertical indexing axis. To create free space for the machining of a workpiece to be arranged on the rotary table, the support is designed for the lateral attachment of at least one of the machining units.

Within the scope of the present description and the claims, the lateral attachment of the machining unit to the support is always to be understood in such a way that the machining unit is attached laterally to the support with regard to a radial direction running toward the indexing axis. The attachment of the machining unit to a side of the support enables the machining unit to be moved laterally past the support away from the indexing axis in the radial direction if required. As a result, free space can be created for the machining of the workpiece where this free space is also required, namely in the center of the rotary indexing machine in the vicinity of the indexing axis. In addition, due to the lateral attachment of the machining unit to the support, the support may also be arranged closer to the indexing axis than would be possible if the machining unit is attached to the inside, pointing toward the indexing axis, of the support, since in the latter case there must of course always be sufficient space for the arrangement of the machining unit between the inside of the support and the workpiece moved past the support on the rotary plate. The arrangement of the supports of the frame closer to the machine center proves to be an additional advantage, since the dynamic rigidity of the machine frame is thereby increased.

The support and the machining unit are preferably designed in such a way that the machining unit having a work spindle can be laterally attached to the support alternatively in a first position with essentially horizontally arranged work spindle or in a second position with essentially vertically arranged work spindle.

Furthermore, the support is preferably designed in such a way that, on one side of the support, two machining units, each with a work spindle provided with a tool, can be attached to the support one above the other in such a way that the two tools can be brought into engagement with the workpiece simultaneously, the workpiece being clamped in a clamping device arranged on the rotary table. By virtue of the fact that the workpiece is machined simultaneously with two work spindles in one working position of the rotary table, the number of working positions required for the machining of the workpiece can be reduced and the efficiency of the rotary indexing machine can be increased as a result.

The two machining units on one support side may each be designed for the traverse of their work spindles in three directions in accordance with three translatory axes of motion. As a result, the workpiece can be machined simultaneously at one machining station by means of two work spindles which are each movable independently of one another with three translatory degrees of freedom.

In a preferred embodiment of the invention, the support has two sides, to each of which at least one machining unit can be attached. The support is preferably designed in such a way that two machining units, each with a work spindle displaceable independently along three axes, can each be attached to both sides of the support one above the other in such a way that the tools on the two work spindles on one support side can simultaneously be brought into engagement with a workpiece arranged in a working position of the rotary table in front of this support side.

In the embodiment of the invention with a support which has two sides designed for attaching machining units, the two sides are preferably arranged in a wedge shape on an essentially vertically extending section of the support in such a way that the tip of the wedge is directed in the radial direction toward the indexing axis.

Owing to the fact that the support is designed in a wedge shape and is arranged in such a way that the tip of the wedge is directed in the radial direction toward the indexing axis, additional free space is created for the machining of the workpiece where this space is also required, namely in the center of the rotary indexing machine in the vicinity of the indexing axis. Since the thickness of the support increases radially outward, sufficient rigidity and stability of the support is nonetheless ensured.

Due to the narrow design of the support at its radially inner margin, the accessibility of the central part of the rotary indexing machine, in particular of the rotary table, the satellites and the indexing devices, is additionally improved. This proves to be advantageous especially during the adjustment or setting-up of the rotary indexing machine for the machining of a new lot of workpieces, in particular in the case of small lot sizes. On the whole, the ergonomics of the rotary indexing machine are improved by this measure.

In a preferred embodiment of the invention, the support is designed in such a way that the tip of the wedge encloses an acute angle of less than 90 degrees. The angle enclosed by the tip of the wedge is preferably even less than 45 degrees, an angle of approximately 30 degrees being especially preferred.

In the rotary indexing machine according to the invention, the machining units are preferably arranged on the essentially vertically extending support sections of wedge-shaped cross section. In principle, however, the machining units may also be arranged at other locations of the machine frame.

At the bottom end of the vertically extending section, a support may have a bottom support section for fastening the support to a fixed pedestal of the machine and/or to a fixed base unit of the machine, the bottom support section being angled relative to the vertically extending support section in the direction of the indexing axis of the rotary indexing machine, so that the support overall has an essentially L-shaped configuration. Furthermore, the support, at the top end of the vertically extending section, may have a top support section which is designed for connecting to the other supports of the rotary indexing machine and which in turn is angled relative to the vertically extending support section in the direction of the indexing axis of the rotary indexing machine, so that the support overall has an essentially C-shaped configuration. An annular connecting device may be provided for the connection to the other supports, this annular connecting device being firmly connected to the top support section of each of the supports in order to increase the stability and the rigidity of the frame formed by the supports.

In a further preferred embodiment of the invention, the rotary indexing machine comprises a fixed base unit and a rotary table which is rotatable relative to the base unit about a vertical indexing axis and on which a satellite provided with at least one clamping device for clamping a workpiece is arranged so as to be rotatable about a vertical satellite rotation axis relative to the rotary table. Furthermore, a satellite drive device is arranged on the rotary table, this satellite drive device moving along with the latter and permitting rotation of the satellite about the satellite rotation axis during the rotation of the rotary table about the indexing axis. In this embodiment of the invention, the satellite preferably has a shaft, which leads through the rotary table, is rotatable relative to the rotary table about the satellite rotation axis and is connected to the satellite in a rotationally locked manner and on whose end face facing the base unit a Hirth serration system is arranged. An indexing device is arranged on the base unit, the indexing device having a column or annular disk, which is linearly displaceable parallel to the indexing axis and on whose end face facing the rotary table a Hirth serration system corresponding to the Hirth serration system on the satellite shaft is arranged. The arrangement is such that, to index the satellite, the Hirth serration system of the indexing device can be displaced linearly in the direction of the rotary table in order to mesh with the Hirth serration system of the satellite and thereby effect the indexing of the satellite. To release the indexing, the Hirth serration system of the indexing device can in turn be displaced linearly in the direction away from the rotary table.

In a further preferred embodiment of the invention, the rotary indexing machine has a fixed base unit and a rotary table rotatable relative to the base unit about a vertical indexing axis. Furthermore, the rotary indexing machine comprises drive means for driving the rotary table, the drive means comprising an electrical machine designed as a directly driven rotary spindle and having a stator which is firmly connected to the base unit and a rotor which is firmly connected to the rotary table. The rotary indexing machine in this embodiment of the invention also preferably comprises a measuring device for the exact measurement of the position and the speed of the rotor relative to the stator and a circuit arrangement, comprising a cascade controller with feedback of the speed and position, for controlling the directly driven rotary spindle. A method of constructing a rotary indexing machine in this embodiment of the invention may comprise a step based on the harmonic balance method for optimizing the system parameters of the directly driven rotary spindle and of the circuit arrangement for controlling the directly driven rotary spindle. As an alternative to the directly driven rotary spindle, the drive means for driving the rotary table may comprise a conventional rotary table motor.

A rotary indexing machine according to the invention preferably has a fixed pedestal and a rotary table rotatable relative to the pedestal about a vertical indexing axis, the pedestal for collecting chips, coolants and/or lubricants being designed in a funnel shape and having surfaces inclined downward toward its center at the indexing axis. In this embodiment of the invention, for the disposal of chips, the funnel-shaped pedestal of the rotary indexing machine preferably has a funnel outlet opening onto a chip conveyor belt.

As an alternative to the funnel-shaped pedestal, a rotary indexing machine according to the invention, having a fixed pedestal and a rotary table rotatable relative to the pedestal about a vertical indexing axis, may comprise a chip conveying device arranged below the rotary table for the disposal of chips, this chip conveying device being designed for conveying the chips around the pedestal and/or around a fixed base unit of the rotary indexing machine, the chips being conveyed up to an outlet opening and falling through the latter preferably onto a chip conveyor belt. A fixed collecting device for collecting chips, coolants and/or lubricants is preferably formed and arranged in a funnel shape below the rotary table in such a way that the chips are conveyed to the chip conveying device, leading around the pedestal, essentially by the force of gravity.

The following detailed description of the present invention serves in combination with the attached drawings only as an example for a better understanding of the invention and is not to be interpreted as a restriction of the scope of protection of the patent claims. For the person skilled in the art, further advantageous embodiments and combinations of features, which, however, are still within the scope of the present invention, are readily discernible from the description below in combination with the attached drawings and all the patent claims.

BRIEF DESCRIPTION OF THE DRAWINGS

The drawings represent preferred embodiments of the present invention. In the drawings:

FIG. 3b shows a detail view of a Hirth serration system from FIG. 3a;

FIG. 4a shows a support for the rotary indexing machine from FIG. 1 in a plan view from the front;

FIG. 4b shows the support from FIG. 4a in a plan view from the rear;

FIG. 4c shows the support from FIG. 4a in a side view;

FIG. 4d shows a cross section along line A—A in FIG. 4c;

FIG. 5 shows a perspective view of the rotary indexing machine from FIG. 1 with closed machine housing;

The same parts are always provided with the same reference numerals in the figures.

WAYS OF IMPLEMENTING THE INVENTION

Figure 1:
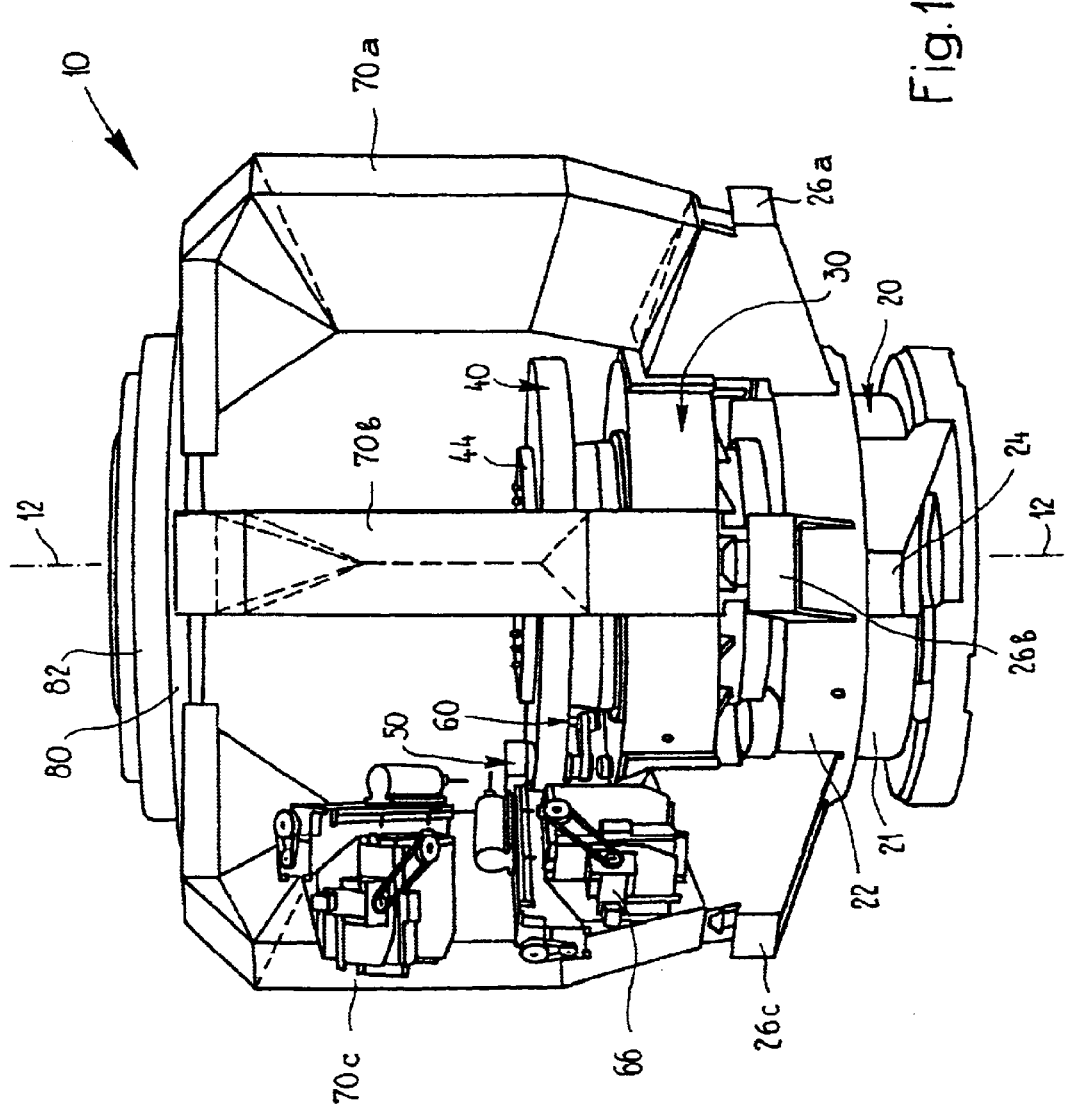
FIG. 1 shows a perspective view of a rotary indexing machine without housing in a first preferred embodiment of the invention.

A rotary indexing machine 10 is shown in FIGS. 1 to 5 in a first preferred embodiment of the present invention.

The rotary indexing machine 10 shown in FIGS. 1 to 5 has a pedestal 20, which is arranged on a solid foundation 25 in a conventional manner for machine tools. The pedestal 20 is produced from polymer concrete (also called mineral casting) and serves as a robust mounting pedestal for the rotary indexing machine 10.

The pedestal 20 has a bottom section 21 of essentially circular cross section. A continuous horizontal leadthrough 24 for the chip conveyor belt 96 (described below) is formed through the bottom pedestal section 21, the leadthrough 24 leading along a diameter through the center.

The center pedestal section 22, which is arranged above the horizontal leadthrough 24 for the chip conveyor belt 96, has a funnel-shaped (or shell-shaped) part with surfaces 27 inclined downward toward its center. This center pedestal section 22 serves to collect chips, coolants and/or lubricants. The liquid coolants and/or lubricants are collected by the pedestal 20 (also called funnel pedestal below) and, for reuse, are preferably returned into an intermediate storage device or into the corresponding feed lines of the rotary indexing machine 10 via a ring line and/or other suitable lines (not shown).

In its center, the center section 22 of the funnel pedestal 20 has a funnel outlet 28, which leads downward into the abovementioned horizontal leadthrough 24 and which, in the rotary indexing machine 10 shown, opens onto a chip conveyor belt. The chips are collected by the funnel pedestal 20, directed toward the center and discharged through the funnel outlet 28 onto the chip conveyor belt 96, which conveys the chips further away from the rotary indexing machine 10, e.g. into a mobile transport container 92. The entire chip space of the rotary indexing machine 10 is free underneath and its bottom is formed by the surfaces 27, inclined toward the funnel outlet 28 in the center, of the funnel-shaped pedestal part 22, which avoids a situation in which the chips stick to machine parts in such a way they impair the function of the rotary indexing machine 10. The abovementioned design of the funnel pedestal 20 enables a chip conveyor belt 96 to be directed in the direction of a diameter through the center of the machine cross section. Since the conveyor belt 96 is arranged in the lowermost region of the rotary indexing machine 10, it does not disturb the functions of the latter.

To extend the funnel 22 in the radial direction, fastening carriers 26a, 26b, 26c, which rise outward, are arranged on the periphery of the center pedestal section 22. Collecting panels can be fastened to these carriers 26a, 26b, 26c (outward in the radial direction in the extension of the funnel surface) in order to collect chips, coolants and/or lubricants and to direct them to the funnel outlet 28, which chips, coolants and/or lubricants would otherwise fall down outside the funnel pedestal 20. In the rotary indexing machine 10 shown in FIGS. 1 to 5, these collecting panels are produced from steel sheet, and the fastening carriers 26a, 26b, 26c for the collecting panels are designed as an integral component of the supports 70a, 70b, 70c described further on.

The top pedestal section 23 has the shape of a hollow-cylindrical frustum and serves to accommodate the machine base 30 described below.

The pedestal 20 of the rotary indexing machine 10 according to the invention therefore has two functions: firstly it serves as a robust mounting pedestal for the rotary indexing machine 10 and secondly it serves to collect chips, coolants and/or lubricants.

The so-called base unit 30 (also called a stand) is arranged on the pedestal 20 of the rotary indexing machine 10. The base unit 30 has a hollow-cylindrical bottom section 31, the inside diameter of which is slightly larger than the outside diameter of the abovementioned hollow-cylindrical frustum of the top pedestal section 23. The bottom section 31 of the base unit 30 serves to create a firm connection to the pedestal 20. During assembly of the machine 10, the base unit 30 is put onto the funnel pedestal 20 in such a way that its hollow-cylindrical bottom section 31 encloses the topmost, frustocylindrical pedestal section 23 like a cap sleeve. The base unit 30 is then adjusted with regard to its horizontal position. The base unit 30 is then cast to the pedestal 20 with polymer concrete in order to create a firm connection between the base unit 30 and the pedestal 20.

Furthermore, the base unit 30 has a solid, annular center section 32, which carries the fixed parts of the indexing devices 60 (described further on) and on which the supports 70*a*, 70*b*, 70*c* (likewise described further on) are also arranged. The center section 32 of the base unit 30 has a substantially larger diameter than the bottom section 31 or the top section 33, described below, of the base unit 30.

The top section 33 of the base unit 30 again has the shape of a hollow-cylindrical frustum. On the one hand, it serves to accommodate the main drive motor 46 of the rotary indexing machine 10, the main drive motor 46 driving the rotary table 40 for rotation about the indexing axis 12 of the rotary indexing machine 10, and, on the other hand, it carries the main bearing 41, on which the rotary table 40 is mounted so as to be rotatable relative to the base unit 30 about the vertical indexing axis 12.

The base unit 30 serves as a reference base for the accurate positioning of all the machine parts. Furthermore, the base unit 30 serves as carrier for the main bearing 41 of the rotary table 40 and as carrier for the main drive motor 46 of the rotary indexing machine 10.

In the embodiment of the invention shown in FIGS. 1 to 5, the base unit 30 is produced from ductile cast iron. In alternative embodiments of the invention, however, the base unit may also be produced from other suitable materials, such as, for example, gray cast iron.

The main drive motor 46 used for the rotary indexing machine 10 is an electric motor which is designed as a directly driven rotary spindle 46 ("brushless ring torque motor") and the stator 42 of which is firmly connected to the top section 33 of the base unit 30 and the rotor 43 of which is firmly connected to the rotary table 40. A directly driven rotary spindle 46 from "EAAT, Chemnitz, Germany" is used for the rotary indexing machine 10 shown in FIGS. 1 to 5. In FIG. 2, the stator and the rotor of the main drive motor 46 are intimated with the reference numerals 42 and 43 respectively. The hollow-cylindrical stator 42 is firmly arranged on the inner wall of the hollow-cylindrical top section 33 of the base unit 30 by means of screws or in another suitable manner. The rotor 43 of the main drive motor 46 is arranged in the interior space of the stator 42 without touching the latter and projects upward beyond the stator 42 in the axial direction. At its top end, the rotor 43 is firmly screwed to a circular, lid-like connecting plate 44, which forms the central part 44 of the rotary table 40. This connecting plate 44 is in turn connected by means of screws to the annular outer part 45 of the rotary table 40.

To mount the rotary table 40 on the base unit 30, the top section 33 of the base unit 30 carries a so-called thrust/radial bearing 41, as sold by INA for example. The rotary table 40 is mounted so as to be rotatable on this main bearing 41.

The rotary table 40, the main bearing 41 and the motor 46 have a multipart detachable structure. As a result, the rotary table 40, the bearing 41 and/or the motor 46, if need be, can be detached and removed at the top from the rotary indexing machine 10 without the hydraulic and/or electrical connections to the satellites 50 (described further on) also having to be interrupted at the same time for this purpose and having to be reconnected again later.

The main drive motor 46 is provided with a measuring device for the exact measurement of the position and speed of the rotor 43 relative to the stator 42 (or the base unit 30). The speed of the motor 46 can either be measured directly or, in an alternative embodiment of the measuring device, determined indirectly from multiple position measurements. The measuring signals of the measuring device are used for controlling the drive of the main drive motor 46 (which as mentioned above has the form of a directly driven rotary spindle 46). The circuit arrangement for controlling the main drive motor 46 comprises a cascade controller with feedback of the speed and the position. By means of the harmonic balance method, the system parameters of the controller and of the main drive motor 46 were optimized at the design phase with regard to the control quality and robustness.

In the rotary indexing machine 10 shown in FIGS. 1 to 5, by means of the apparatus optimized according to the method described and consisting of directly driven rotary spindle 46 and associated control circuit arrangement, a very high positioning speed is achieved with at the same time such a high load rigidity that it is no longer necessary to lock the rotary table 40 in its respective working position. As a result, in the case of the rotary indexing machine 10 according to the invention, an extremely fast and highly dynamic drive of the rotary table 40 and thus a considerable increase in efficiency compared with conventional rotary indexing machines are achieved.

The work-holding devices or satellites 50 are mounted on the rotary table 40 in each case so as to be rotatable about a vertical satellite rotation axis 55 relative to the rotary table 40. Each satellite 50 is provided with at least one clamping device 56 for clamping a workpiece. In order to permit rotation of the satellites 50 (and thus of the workpieces) about their satellite rotation axes 55 during the rotation or indexing of the rotary table 40 from one working position into its next working position, each satellite 50 is provided with a satellite drive device 52, 53, 54, which is arranged on the rotary table 40 and moves along with the latter about the indexing axis 12. The satellite drive devices 52, 53, 54 serve the coarse positioning of the satellites 50 (and thus of the workpieces) with regard to the rotational movements about their satellite rotation axis 55, in which case this coarse positioning can be carried out during the rotation of the rotary table 40 about the indexing axis 12. The fine positioning of the satellites 50 (and of the workpieces) is carried out with the indexing device 60 (described further on) when the rotary table 40 is resting in a working position.

For the sake of clarity, merely a single satellite 50 is shown in FIGS. 1 to 5. In reality, sixteen satellites 50 are arranged on the rotary table 40 in the rotary indexing machine 10 shown in FIGS. 1 to 5. It goes without saying that a larger or a smaller number of satellites may just as easily be arranged on the rotary table in other embodiments of the invention.

The satellite drive device 52, 53, 54 comprises a preferably electrically operable motor 54 (designated below as satellite motor 54), which is attached to the rotary table 40 and drives the actual satellite 50 via a toothed-belt/pinion drive. The satellite 50 has a satellite shaft 51, which is rotatable relative to the rotary table 40 about the satellite rotation axis 55 and to which a drive pinion 52 is attached in a rotationally locked manner. The drive pinion 52 (and thus the satellite shaft 51) can be driven via the toothed belt 53 by the satellite motor 54 for rotation about the satellite rotation axis 55. The satellite shaft 51 is arranged in a bore passing through the rotary table 40 and is mounted so as to be rotatable relative to the rotary table 40. In the embodiment of the invention shown in FIGS. 1 to 5, the toothed belt 53 and the drive pinion 52 are arranged below the rotary table 40. In other embodiments, the toothed belt and drive pinion of the satellite may also be arranged above the rotary table. Since, in the embodiment of the invention shown in FIGS. 1 to 5, the satellite drive device 52, 53, 54 is provided merely for the rotation of the satellite 50 for the coarse positioning of the satellite 50 (during the indexing of the rotary table 40), but not for the rotation of the satellite 50 during the machining of the workpiece in the working positions of the rotary table 40, the components of the satellite drive device (in particular the satellite motor 54) may be designed to be comparatively delicate and consequently light and cost-effective.

Arranged on the axially bottom end of the satellite shaft 51 is an annular disk 57 firmly connected to the satellite shaft 51 (instead of an annular disk 57, a column or the like may also be used in other embodiments of the invention). In the exemplary embodiment of the invention shown in FIGS. 1 to 5, the annular disk 57 is arranged directly below the drive pinion 52 of the satellite shaft 51. The annular disk 57 may be fastened to the shaft 51 by means of screws, welding or the like, or it may be designed as an integral part of the shaft 51. The underside of the annular disk 57 essentially forms the bottom end face of the satellite 50 or the satellite shaft 51. This disk underside is provided with a face serration system 58 having radial teeth like a Hirth serration system 58 in order to interact with a corresponding Hirth serration system 62 on the top side of a disk 61 or column of the indexing device 60 described further on.

A clamping device for clamping one or more workpieces in place on the satellite shaft is arranged on the axially opposite, top end of the satellite shaft. On account of the firm connection between the shaft (or the satellite) and the workpiece, the positioning of the workpiece may be effected via the positioning of the satellite.

For indexing the satellites 50 (i.e. for positioning them in a precise manner and for fixing them in place), an indexing device 60 is assigned to each machining station of the rotary indexing machine 10 and is arranged on the center section 32 of the base unit 30 below the rotary table 40.

The indexing device 60 comprises an annular disk 61 which is displaceable in the vertical direction (i.e. parallel to the indexing axis of the rotary indexing machine 10) and the top side of which is provided with a Hirth serration system 62 (instead of an annular disk 61, a column or the like may also be provided in other embodiments of the invention). The annular disk 61 is linearly displaceable in the vertical direction by means of a hydraulic piston device 63. The Hirth serration system 62 on the top side of the annular disk 61 of the indexing device 60 is designed to match the Hirth serration system 58 on the underside of the annular disk 57 of the satellite shaft 51 in order to interact with the latter like a Hirth coupling.

During operation of the rotary indexing machine 10, the annular disk 61 of the indexing device 60 is displaceable in the vertical direction merely in a linear manner relative to the base unit 30, but is not arranged so as to be rotatable. Any rotational movements of the annular disk 61 of the indexing device 60 are locked by an antirotation locking device during operation of the rotary indexing machine 10.

In the embodiment of the invention shown in FIGS. 1 to 5, the annular disk 61 of the indexing device 60 is arranged directly on a piston, which is guided in the base unit 30 so as to be movable in the vertical direction. When the rotary indexing machine 10 is being set for machining a new workpiece, the antirotation locking device of the piston (and thus of the annular disk 61) can be released and the annular disk 61 can be rotated about its vertical displacement axis. When the machine 10 is being set, the rotational position of the annular disk 61 of the indexing device 60 is set extremely accurately, i.e. with a tolerance of 0.01 degrees, and is then locked by means of the antirotation locking device.

During operation of the rotary indexing machine 10, the positioning of the satellite 50 (and thus of the workpiece) is effected in two steps. In a first step, which can be carried out during the rotation of the rotary table 40 about the indexing axis 12, the satellite 50 is rotated by means of the satellite drive device 52, 53, 54 relative to the rotary table 40 about its vertical satellite rotation axis 55 into the position desired for the next machining station. As soon as the satellite 50 has arrived at the next machining station above the indexing device 60 assigned to this machining station and the rotary table 40 rests in its working position, the annular disk 61 of the indexing device 60, in a second step, is displaced vertically upward by means of the piston device, so that its Hirth serration system 62 meshes with the Hirth serration system 58 of the annular disk 57 on the satellite shaft 51. In the process, the satellite shaft 51 is rotated slightly about the satellite rotation axis 55 and thus the fine positioning of the satellite shaft 51 and of the workpiece on the satellite 50 is carried out until the two serration systems 58, 62 completely fit into one another. The satellite is at the same time fixed in its position by the intermeshing of the two serration systems 58, 62. After the completion of the machining operation at the machining station, the annular disk 61 of the indexing device 60 is displaced downward again away from the rotary table 40, whereupon the rotary table 40 can be indexed into its next working position.

The tolerance to be maintained for the coarse positioning of the satellite 50 in the first step results from the fineness of the Hirth serration systems 58, 62: the coarse positioning merely has to ensure that the two serration systems 58, 62 intermesh with the correct teeth and grooves during the subsequent indexing. In conventional Hirth serration systems, this is ensured if a tolerance of one to two degrees is maintained during the coarse positioning.

In the rotary indexing machine 10 shown in FIGS. 1 to 5, each indexing piston can be actuated independently of the other pistons via a separate hydraulic line. In another embodiment of the invention, it is possible to provide a hydraulic ring line via which all the pistons of the various indexing devices can be actuated synchronously.

Figure 2:
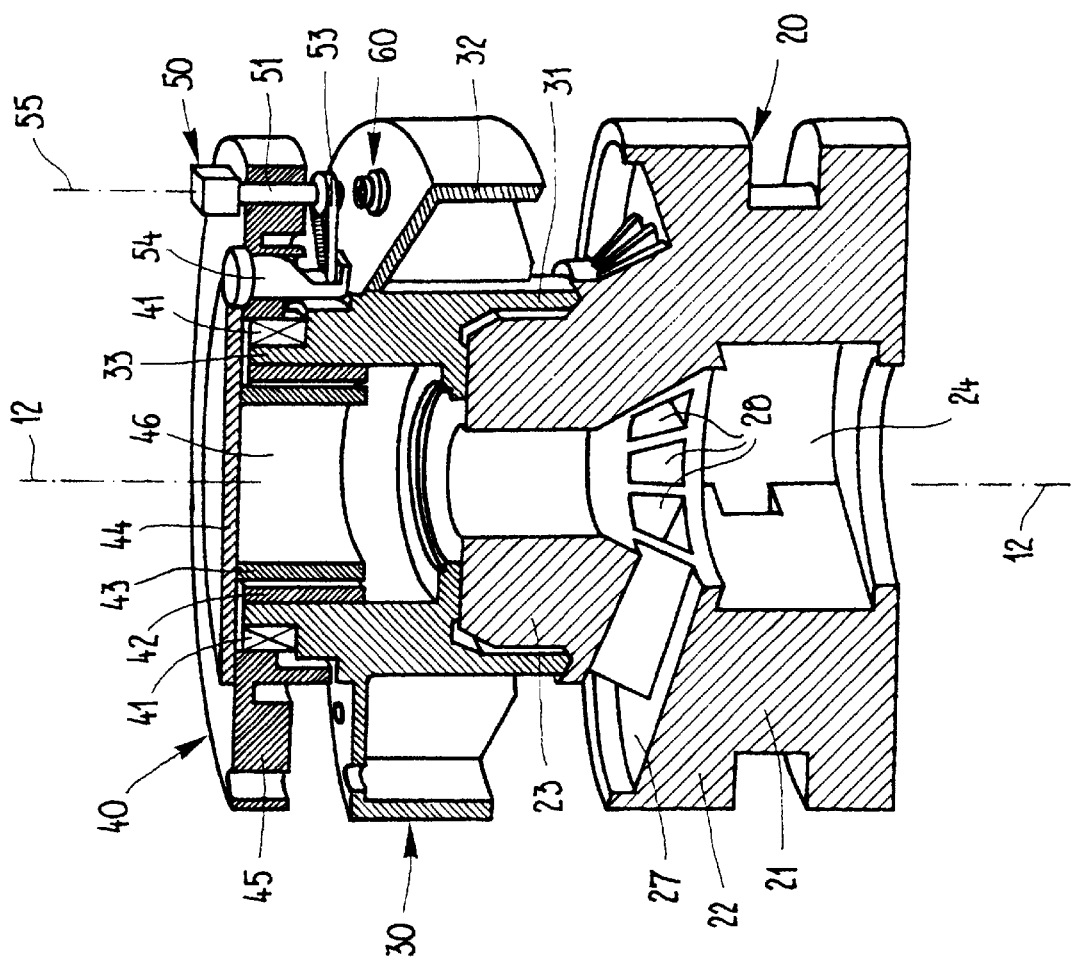
FIG. 2 shows a partial view of the rotary indexing machine from FIG. 1 in a partly sectioned perspective representation.
Figure 3A:
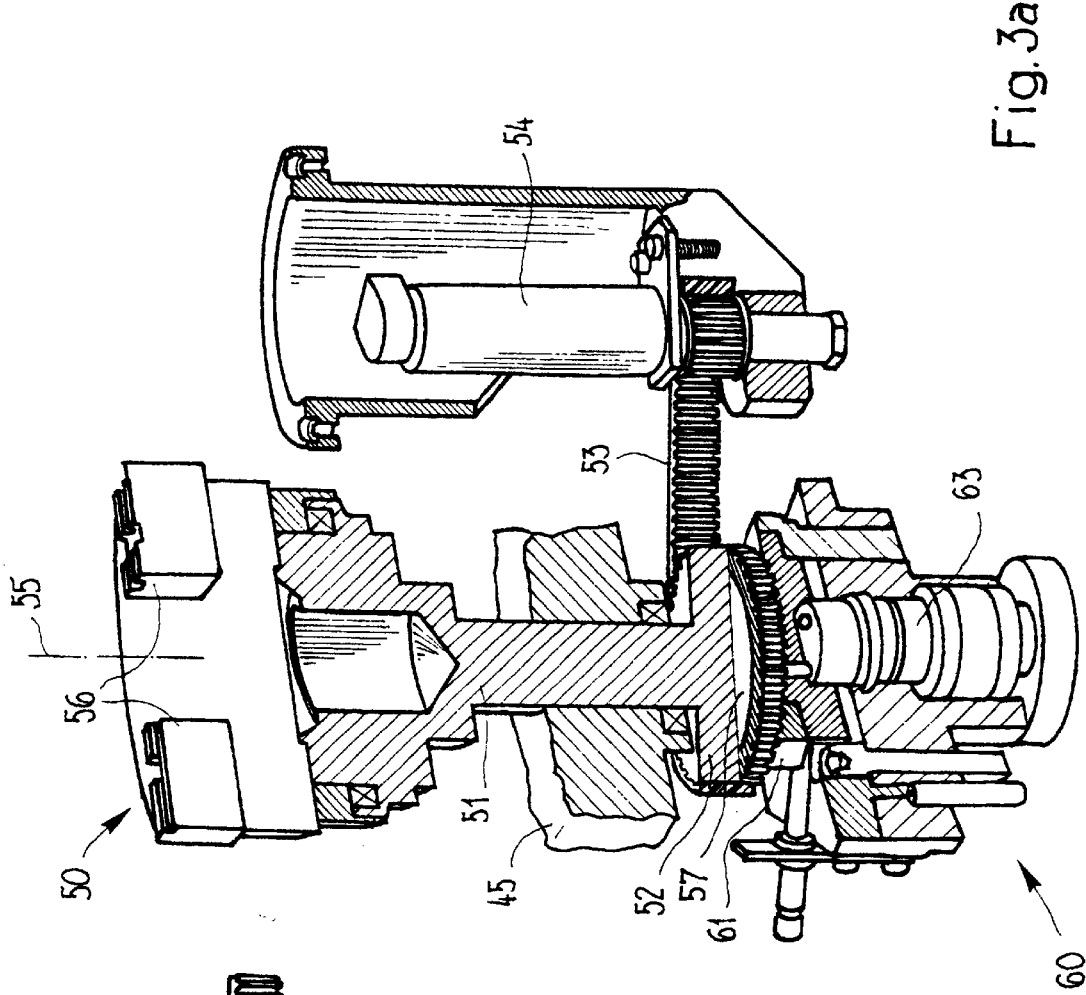
FIG. 3a shows a partial view, in a partly sectioned perspective representation, of a satellite for the rotary indexing machine from FIG. 1.
Figure 3B:
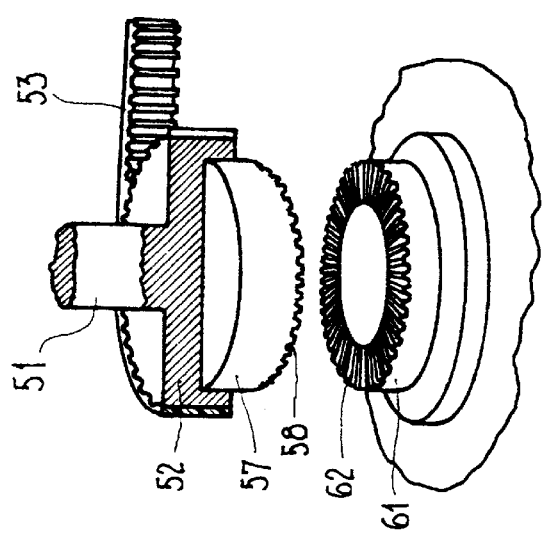

In the case of the rotary indexing machine 10 shown in FIGS. 1 to 5, eight supports 70 are arranged on the outer periphery of the center section 32 of the base unit 30 (for the sake of clarity only three of them are depicted in FIG. 1). It is clear that the number of supports 70 in other embodiments of the invention may differ from eight, depending on how many machining stations are desired for the rotary indexing machine 10. The supports 70 serve to fasten the machining units 66 described further on.

In the embodiment of the invention shown in FIGS. 1 to 5, the supports 70 are produced from unannealed ductile cast iron. To manufacture the supports 70, however, other suitable materials, such as, for example, annealed gray cast iron, may also be used in alternative embodiments of the invention.

Each of the supports 70 shown in FIGS. 1 to 5 has a center section 72 running essentially vertically (i.e. parallel to the indexing axis 12), a bottom section 71 for fastening the support 70 to the base unit 30 and/or to the pedestal 20, and a top section 73, which is designed for connecting to the other supports 70 in order to increase the rigidity and stability of the frame formed by the supports 70. The top section 73 and the bottom section 71 of the supports 70 are angled relative to the center, vertically running section 72 in the direction of the indexing axis 12 of the rotary indexing machine 10, so that the supports 70 essentially have a C-shaped frame. For this reason, the supports 70 are also designated below as C-supports 70.

Due to the C-shaped design of the supports 70 in such a way that the center section 72 of the supports 70 is arranged away from the center of the rotary indexing machine 10 (i.e. eccentrically relative to the rotary table 40), the center of the rotary indexing machine 10 is left free, so that there is sufficient space there for the machining of the workpieces arranged on the rotary table 40. Furthermore, the C-shaped design of the supports 70 provides simple access to the center of the machine, in particular to the rotary table 40, the satellites 50 and the indexing devices 60, which is advantageous when setting up the rotary indexing machine 10 for machining new workpieces.

The center section 72 of the supports 70 has two sides which are designed for the attachment of machining units 66 and are arranged in a wedge shape in such a way that the tip of the wedge is directed in the radial direction toward the indexing axis 12. As a result, the supports 70, at their radially inner end (i.e. where as much free space as possible is required at the rotary indexing machine 10 for the machining of the workpiece and/or for setting up the machine 10 for the machining of the workpiece), occupy less space than at their radially outer end at the outer periphery of the machine 10, where there is sufficient space. The supports 70 overall therefore have a shape which looks like a lemon segment.

In the embodiment of the invention shown in FIGS. 1 to 5, the lowermost section 71 of the supports does not have a wedge-shaped cross section but rather a rectangular cross section (this does not prove to be disadvantageous either with regard to the accessibility or with regard to the creation of free space in the center of the rotary indexing machine 10, since no machining of the workpiece takes place and no setting-up work is to be carried out in the region of the lowermost support section 71). During assembly of the rotary indexing machine 10, the supports 70 are first of all bolted to the base unit 30 by a firm bolted connection being produced between the bottom support section 71 and the center section 32 of the base unit 30 by means of conventional draw-in bolts. The supports 70 are then additionally fastened to the pedestal 20 by a bolted connection being produced between the bottom support section 71 and the center pedestal section 22 by means of draw-in/clamping bolts. By the use of draw-in/clamping bolts for fastening the supports 70 to the pedestal 20, possible inaccuracies in the positioning of the base unit 30 relative to the pedestal 20 can be compensated for in order to prevent any stresses in the supports 70.

In the rotary indexing machine 10 shown in FIGS. 1 to 5, the lowermost part of the C-supports 70 is at the same time designed as a fastening carrier 26a, 26b, 26c for the previously mentioned collecting panels in order to provide an extension of the chip-collecting funnel outward in the radial direction.

In the embodiment of the invention shown in FIGS. 1 to 5, the center section 72 of the supports essentially comprises two side walls 74, 75, which converge at an acute angle toward the center of the rotary indexing machine 10, and a rear wall 76, arranged transversely to and connecting the side walls 74, 75, at the outer periphery of the frame formed by the supports 70. The cross section of the supports 70 therefore essentially has the shape of an acute triangle, the apex of which is directed toward the indexing axis 12 of the rotary indexing machine 10. In another embodiment of the invention, the rear wall of the supports is omitted, so that the support [sic] have an essentially V-shaped cross section.

The side walls 74, 75 of the center section 72 of the supports 70 are designed for accommodating machining units 66 for the machining of the workpiece (for the sake of clarity only a single machining unit 66 is shown in the FIGURES). In the case of the rotary indexing machine 10 shown in FIGS. 1 to 5, each side wall 74, 75 of a support 70 is provided with a top fastening device for fastening a top machining unit 66 and a bottom fastening device for fastening a bottom machining unit 66. As a result, four machining units 66 can be arranged on each support 70, namely one on each side at the top and one on each side at the bottom.

On each side of the supports 70, the top and the bottom machining units 66, each with a work spindle provided with a tool, are arranged one above the other in such a way that the two tools can be brought into engagement with the workpiece simultaneously, the workpiece being arranged on a satellite positioned in front of the corresponding side wall 74, 75. Each of the total of sixteen side walls 74, 75 of the eight supports 70 defines a machining station of the rotary indexing machine 10. At each of these sixteen machining stations, in each case two work spindles can be brought into engagement with the workpiece simultaneously, in which case the rotary indexing machine 10 shown in FIGS. 1 to 5 may be equipped with a total of thirty-two machining units 66.

However, in the rotary indexing machine 10 shown in FIGS. 1 to 5, one of the eight supports 70 may also be omitted in order to create sufficient space for the work transfer for feeding the unmachined workpieces and/or for the removal of the machined workpieces.

The fastening devices for fastening the machining units 66 to the side walls 74, 75 of the supports 70 and the machining units 66 are designed in such a way that the machining units 66, which each have a work spindle, can be attached to the side walls 74, 75 of the supports 70 alternatively in a first position with essentially horizontally arranged work spindle or in a second position with essentially vertically arranged work spindle.

All the machining units 66 are designed for traversing their work spindles in three directions in accordance with three translatory axes of motion. As a result, the workpiece can be machined simultaneously by means of two work spindles at one machining station (or in one working position of the rotary table 40), the work spindles being movable independently of one another with three translatory degrees of freedom each. Together with the possibility of rotating the workpieces about the satellite rotation axis (during the indexing of the rotary table 40), this permits four-axis machining of the workpieces (with three translatory and one rotational degree of freedom).

All the fastening devices on the left-hand sides of the supports 70 are identical to one another, and all the fastening devices on the right-hand sides of the supports 70 are identical to one another. Likewise, there are only two different, universally useable, multifunctional types of machining units 66, namely one which is designed for fastening to the left-hand side section 73 and the center support section 72. The radially inner end of the top support section 73 is designed for connecting to a stabilizing ring 80.

To increase the rigidity and stability of the frame formed from the supports 70, the top support sections 73 are connected to one another at their radially inner end by means of a stabilizing ring 80. In the embodiment of the invention shown in FIGS. 1 to 5, the connection between the stabilizing ring 80 and the supports 70 is made by means of bolts and nuts in order to prevent any stresses from being produced in the supports 70. In alternative embodiments of the invention, other types of connection, such as, for example, welding, may also be used. As an entity, the supports 70 connected to one another by the stabilizing ring 80 form a cupola-shaped frame which is characterized by high rigidity and stability.

Furthermore, a mushroom-shaped cap 82 which covers the machine 10 at the top is arranged on the stabilizing ring 80. The cap 82 at the same time serves as a guide for the doors 84 of a machine housing 83, which covers the machine 10 at the side and partly also at the top.

The pumps required for supplying the rotary indexing machine 10 with hydraulic oil and/or coolant and the circuit arrangements for controlling the machine 10 are preferably arranged outside the machine housing 83 in a separate housing 90. The feed lines for current, hydraulic oil and coolant may alternatively be directed along the floor to the pedestal 20 of the machine 10 and/or to the covering cap 82 via an elevated line arrangement 85. In particular, the control and supply lines to the satellites 50 are preferably directed to the satellites 50 from above from the covering cap 82.

Figure 6:
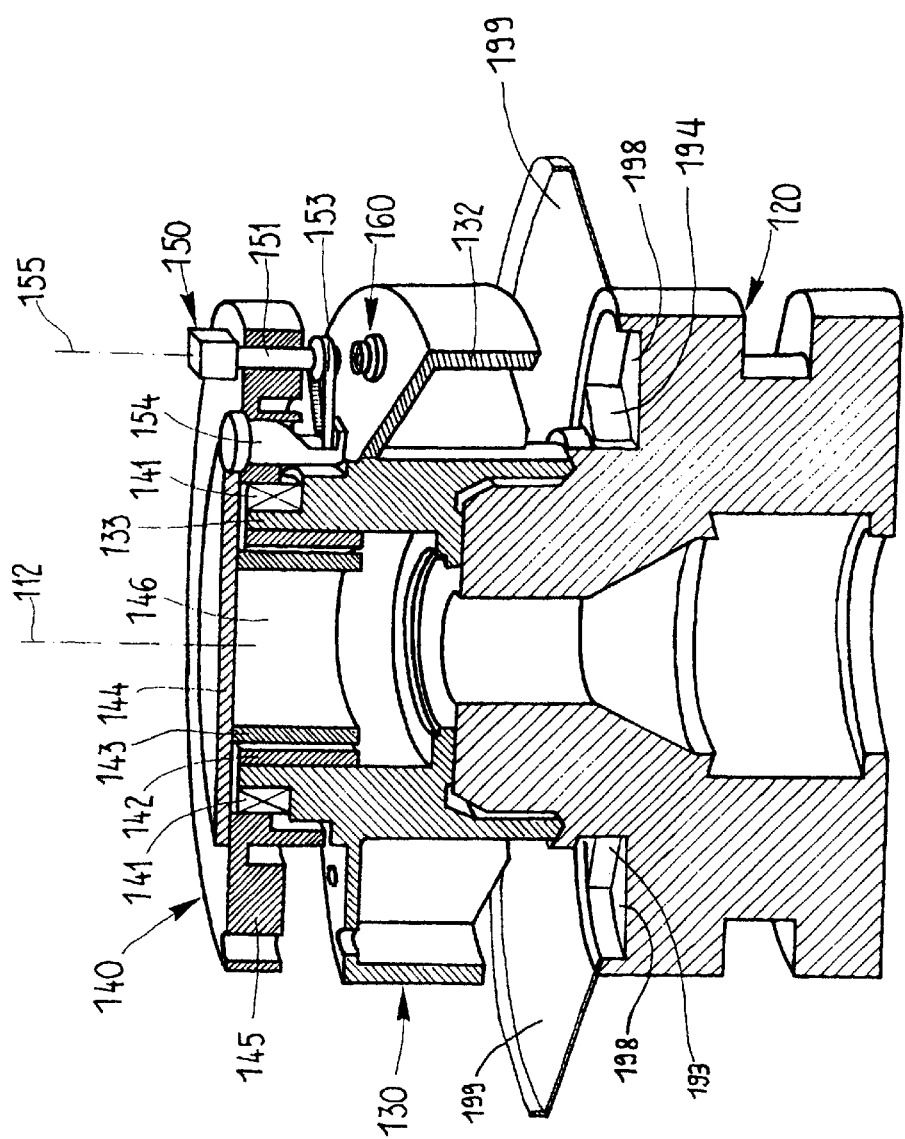
FIG. 6 shows a partial view of a rotary indexing machine in a second preferred embodiment of the invention in a partly sectioned perspective representation.

A second preferred embodiment of the present invention is shown in FIG. 6 in a partly sectioned, perspective representation corresponding to FIG. 2. The rotary indexing machine shown in FIG. 6 differs from walls and one which is designed for fastening to the right-hand side walls. Since the machining units 66 can be attached to a side wall alternatively at the top or bottom and alternatively with horizontally or vertically arranged work spindle, no further types of machining units are required. The rotary indexing machine 10 can be equipped essentially with two types of machining units 66 designated as standard units. This permits a modular construction of the rotary indexing machine 10. Compared with conventional rotary indexing machines, where specialized machining units are used for each machining station, the standardized machining units 66, in the rotary indexing machine 10 according to the invention, results in a considerable cost advantage with regard to procurement and maintenance of the machining units 66.

In the rotary indexing machine 10 shown in FIGS. 1 to 5, the supply lines and the control lines to the machining units are directed through the interior space of the supports 70 to the machining units 66. As a result, the accessibility of the rotary table 40 and of the indexing devices 60 is further improved and an ergonomic rotary indexing machine 10 is thus created.

In an alternative embodiment of the invention, a so-called center unit, instead of a conventional, multifunctional machining unit, is fastened to one of the supports, preferably to one of the top fastening devices, this center unit permitting the machining of the workpiece from the center of the rotary table. The center unit may have a drilling spindle, for example, in order to permit the drilling of holes in the workpiece radially outward from the center.

The top section 73 of the supports 70 comprises an essentially horizontally arranged, box-shaped arm running from the center support section radially inward in the direction of the center of the rotary indexing machine 10 and having a rectangular cross section. For reasons of stability, reinforcing ribs and/or plates may be arranged in the angle between the top support the rotary indexing machine 10 shown in FIGS. 1 to 5 solely by a different arrangement for the chip disposal.

The rotary indexing machine shown in FIG. 6 has a pedestal 120 of essentially circular cross section. Instead of the funnel-shaped part in the embodiment shown in FIGS. 1 to 5, the pedestal 120 of the rotary indexing machine shown in FIG. 6 is provided with an annular channel 198 running along the outer periphery of the pedestal. The annular channel 198 has an essentially rectangular channel cross section with a horizontal channel bottom, and it is open at the top.

A fixed, funnel-shaped collecting device 199 for collecting chips, coolants and/or lubricants, which fall down from above into the collecting device 199, is arranged so as to adjoin the top channel margin outward in the radial direction. The collecting device 199 consists of collecting panels which are arranged in a shell shape around the annular channel 198 and so as to rise outward in the radial direction in such a way that the chips collected by the collecting panels are conveyed into the annular channel 198 essentially by the force of gravity.

The annular channel 198 is provided with a number of rectangular conveying segments 193, 194, which correspond to the channel cross section, are arranged transversely to the channel and are moved continuously in the annular channel 198 about the pedestal 120 by a suitable drive device. A rotary chip conveyor is thus created. A discharge opening (not shown), which opens onto a chip conveyor belt (not shown), is formed at a suitable location in the channel bottom. The chips in the annular channel 198 are carried along by the conveying segments occupying the channel cross section and conveyed along the annular channel about the pedestal 120 until they fall through the discharge opening in the channel bottom onto the chip conveyor belt and are conveyed away from the rotary indexing machine by the latter.

On the whole, the invention provides a rotary indexing machine which has a frame for fastening machining units, this frame being characterized by high rigidity and stability, a large free space for machining workpieces being created at the same time in the region of the rotary table, and good accessibility of the satellites, the indexing devices and the rotary table being ensured for the adjustment or setting-up of the machine. Furthermore, the rotary indexing machine according to the invention has an extremely fast and highly dynamic drive for the rotary table and permits timesaving and nonetheless accurate indexing of the satellites.

What is claimed is:

1. A rotary indexing machine having a fixed machine frame, which is designed for holding a multiplicity of machining units and comprises:

at least one support, and a rotary table rotatable relative to the machine frame about a vertical indexing axis, said support comprising a side wall extending towards a center of the rotary indexing machine, said side wall being provided with a top fastening device for fastening a first one of said machining units and a bottom fastening device for fastening a second one of said machining units.

2. The rotary indexing machine according to claim 1, wherein one of said first and second machining units having a work spindle, said machining unit and its associated fastening device being designed for lateral attachment of the machining unit to the side wall alternatively in a first position with essentially a horizontally arranged work spindle or in a second position with essentially a vertically arranged work spindle.

3. A rotary indexing machine having a fixed machine frame, which is designed for holding a multiplicity of machining units and comprises:

at least one support, and a rotary table rotatable relative to the machine frame about a vertical indexing axis, said support comprising a first side wall extending towards a center of the rotary indexing machine and being provided with a first fastening device for fastening a first one of said machining units and a second side wall extending towards the center of the rotary indexing machine and being provided with a second fastening device for fastening a second one of said machining units.

4. The rotary indexing machine according to claim 3, wherein one of said first and second machining units having a work spindle, said machining unit and its associated fastening device being designed for lateral attachment of the machining unit to it's associated side wall alternatively in a first position with essentially a horizontally arranged work spindle or in a second position with essentially a vertically arranged work spindle.

5. The rotary indexing machine according to claim 1, further comprising a clamping device arranged on the rotary table, in which a clamping device is clamped to a workpiece, said first machining unit being fastened to the top fastening device and having a first work spindle provided with a first tool, said second machining unit being fastened to the bottom fastening device and having a second work spindle provided with a second tool, said first and second machining units being arranged such that the two tools are in engagement with the workpiece simultaneously.

6. The rotary indexing machine according to claim 5, wherein said wherein first and second work spindles being movable independently of one another with three translatory degrees of freedom.

7. The rotary indexing machine according to claim 3, wherein the two side walls being arranged in a wedge shape on an essentially vertically extending section of the support, so that the tip of the wedge is directed in radial direction toward the indexing axis.

8. The rotary indexing machine according to claim 7, wherein the tip of the wedge encloses an angle which is less than approximately 45 degrees.

9. A rotary indexing machine according to claim 1 further comprising:
a fixed base unit the rotary table is rotatable relative to the base unit about a vertical indexing axis and on which a satellite is provided with at least one clamping device for clamping a workpiece, the satellite is arranged so as to be rotatable about a vertical satellite rotation axis relative to the rotary table, and
a satellite drive device, which is arranged on the rotary table, is moved along with the latter and permits rotation of the satellite about the satellite rotation axis during the rotation of the rotary table about the indexing axis,
the satellite has a shaft, which leads through the rotary table, is rotatable relative to the rotary table about the satellite rotation axis and is connected to the satellite in a rotationally locked manner and on whose end face facing the base unit a Hirth serration system is arranged, and
an indexing device is arranged on the base unit, the indexing device having a column or annular disk, which is linearly displaceable parallel to the indexing axis and on whose end face facing the rotary table a Hirth serration system corresponding to the Hirth serration system on the satellite shaft is arranged, the arrangement being such that, to index the satellite, the Hirth serration system of the indexing device is displaced linearly in the direction of the rotary table in order to mesh with the Hirth serration system of the satellite and thereby effects the indexing of the satellite, and, to release the indexing, the Hirth serration system of the indexing device is displaced linearly in the direction away from the rotary table.

10. A rotary indexing machine according to claim 1, further comprising:
a fixed base unit and the rotary table is rotatable relative to the base unit about a vertical indexing axis,
wherein a drive means for driving the rotary table comprises an electrical machine designed as a directly driven rotary spindle and having a stator which is firmly connected to the fixed base unit and a rotor which is firmly connected to therotary table.

11. The rotary indexing machine according to claim 10, wherein the rotary indexing machine also comprises a measuring device for the exact measurement of the position and the speed of the rotor relative to the stator and a circuit arrangement, comprising a cascade controller with feedback of the speed and position, for controlling the directly driven rotary spindle.

12. A method of constructing a rotary indexing machine according to claim 11, wherein the method comprises:
based on the harmonic balance method for optimizing; and
a step of providing system parameters of the directly driven rotary spindle and of the circuit arrangement for controlling the directly driven rotary spindle.

13. A rotary indexing machine according to claim 1 further comprising:
a fixed pedestal and the rotary table rotatable relative to the pedestal about a vertical indexing axis, wherein a chip conveying device is arranged below the rotary table for disposal of chips and is designed for conveying the chips around the pedestal or around a fixed base unit of the rotary indexing machine up to an outlet opening.

14. The rotary indexing machine according to claim 13, wherein a fixed collecting device for collecting chips, coolants or lubricants is formed and arranged in a funnel shape below the rotary table that the chips are conveyed to the chip conveying device essentially by the force of gravity.

* * * * *